(12) United States Patent
Rohner (10) Patent No.: US 9,507,048 B2
(45) Date of Patent: Nov. 29, 2016

(54) PENDULUM ARM FLEXURE AND METHOD OF CONSTRUCTION

(71) Applicant: Micro-g LaCoste, Inc., Lafayette, CO (US)

(72) Inventor: Hans Rohner, Nederland, CO (US)

(73) Assignee: Micro-g LaCoste, Inc., Lafayette, CO (US)

( * ) Notice: Subject to any disclaimer, the term of this patent is extended or adjusted under 35 U.S.C. 154(b) by 371 days.

(21) Appl. No.: 14/182,168

(22) Filed: Feb. 17, 2014

(65) Prior Publication Data

US 2015/0234088 A1 Aug. 20, 2015

(51) Int. Cl.
| | |
|---|---|
| *B23P 19/00* | (2006.01) |
| *H05K 13/04* | (2006.01) |
| *G01V 7/12* | (2006.01) |
| *G01V 13/00* | (2006.01) |

(52) U.S. Cl.
CPC ........ *G01V 7/12* (2013.01); *G01V 13/00* (2013.01)

(58) Field of Classification Search
CPC ......... G01V 7/12; G01V 13/00; F16M 13/02
USPC ................ 29/602.1, 729; 248/610; 156/278, 156/309.9; 73/382 R
See application file for complete search history.

(56) References Cited

U.S. PATENT DOCUMENTS

| | | | |
|---|---|---|---|
| 9,291,742 B2 * | 3/2016 | Niebauer | G01V 7/12 |
| 2008/0295594 A1 * | 12/2008 | Aliod | G01V 7/12 |
| | | | 73/382 R |

OTHER PUBLICATIONS

William F. Hoffmann, "A Pendulum Gravimeter for Measurement of Periodic Annual Variations in the Gravitational Constant," Thesis, Jan. 1962, 124 pages, Palmer Physical Laboratory, Princeton University, Princeton, New Jersey.

David R. Curott, "A Pendulum Gravimeter for Precision Detection of Scalar Gravitational Radiation," Thesis, May 1965, 122 pages, Palmer Physical Laboratory, Princeton University, Princeton, New Jersey.

* cited by examiner

*Primary Examiner* — Paul D Kim
(74) *Attorney, Agent, or Firm* — John R. Ley (57) ABSTRACT

A pendulum arm flexure which supports a pendulum bob for oscillation has predictable and reproducible characteristics. Holders retain a specific predetermined length of uniform diameter elongated fiber at ends of the fiber and permit flexing only along a defined length of the fiber between the holders during oscillation. Energy conserving material of the fiber temporarily stores and releases energy when flexing.

22 Claims, 10 Drawing Sheets

PENDULUM ARM FLEXURE AND METHOD OF CONSTRUCTION

CROSS REFERENCE TO RELATED INVENTION

This invention is related to an invention for a Double Pendulum Gravimeter and Method of Measuring Gravity Using the Same, described in U.S application Ser. No. 14/182,091, filed concurrently herewith and assigned to the assignee hereof, now U.S. Pat. No. 9,291,742. The subject matter of this application is incorporated herein by reference.

BACKGROUND OF THE INVENTION

This invention relates to a pendulum, and more particularly, to a new and improved pendulum arm in the form of a flexure which is made of energy-conserving material, such as quartz, and which has a structure that is capable of reproduction in multiple substantially identical units, all of which exhibit substantially identical length, flex, and resonant operating characteristics. Further still, the present invention relates to a new and improved method of construction of such a pendulum arm flexure.

A pendulum is formed by a mass or "bob" that is connected to one end of a pendulum arm. The other end of the pendulum arm is pivotally connected to a stationary structure at a point of suspension or a center of motion. Energy imparted to the bob causes it to swing back and forth in an arc of oscillation at the point of suspension. Gravity sustains the oscillation of the bob until friction dissipates the oscillation energy of the swinging bob.

The time required for the pendulum bob to swing from one maximum amplitude end point in the arc of oscillation back to that same point is the period (T) of the swing. The period (T) of the swing, the gravity (g) and the length of the pendulum arm (L) are related to one another in an ideal pendulum by the following equation (1):

$$T=2\pi[L/g]^{1/2} \quad (1)$$

Knowing or measuring two of the three variables length (L), gravity (g) or period (T) permits the other variable to be calculated. In this manner, a pendulum may be used as a measurement device for determining gravity (g), or precise time intervals (T), or the frequency (f) of the oscillation of the pendulum. The period (T) and the frequency (f) are inversely related to one another by the following well known equation (2):

$$f=1/T \quad (2)$$

It is desirable to minimize the oscillation energy loss associated with the swinging pendulum. Oscillation energy losses have the effect of changing the period (T) and/or increasing the frequency (f). A changing period (T) or frequency (f) makes it very difficult to calculate with precision the quantity which is to be measured with the pendulum. Adding energy to replace that energy lost to friction is very difficult in a pendulum, because the added energy may create aberrations in the swing of the pendulum which in turn affect the ability to precisely measure the desired variable. While energy loss in a pendulum cannot be avoided altogether, minimizing the energy loss has the effect of enhancing the accuracy of measurement.

One significant source of energy loss in a pendulum is the friction at the point of suspension where the pendulum arm connects to the stationary structure. The friction from the movement of the pendulum arm relative to the stationary structure dissipates energy. Even a knife-edge point of suspension creates enough friction to adversely affect the period (T) and frequency (f) in a precision pendulum.

One known technique of diminishing energy loss at the point of suspension is to prevent the pendulum arm from moving relative to the stationary structure. To do so, the pendulum arm must be formed as a resilient flexure which is rigidly connected to the stationary structure at the point of suspension. The other end of the flexure is rigidly connected to the pendulum bob. The rigidly connected ends of the flexure do not move relative to the objects to which they are connected, so there is no frictional loss associated with relative movement at these points. Instead, the flexure bends back and forth as the bob swings in its arc of oscillation.

One known pendulum flexure is formed from a resilient, energy conserving material, such as quartz (fused silica) or other similar amorphous material. Flexing the material in one direction temporarily stores energy as intermolecular or van der Waals forces within the resilient material of the flexure. When the flexure flexes in the opposite direction, the stored energy is released. In this manner, a significant quantity of the oscillation energy is preserved, minimizing the loss of oscillation compared to the frictional losses from relative mechanical movement.

The known pendulum arm flexure is formed of quartz or other energy-conserving material. Examples are described in two theses: A Pendulum Gravimeter for Measurement of Periodic Annual Variations in the Gravitational Constant, by William F. Hoffman, Princeton University, Jan. 1962; and A Pendulum Gravimeter for Precision Detection of Scalar Gravitational Radiation, by David R. Curott, Princeton University, May 1965. The quartz pendulum arm flexures described in these theses are formed by heating the center section of a solid quartz rod until it achieves a viscous and flowable state, and then stretching the viscous center section to draw it out to a long, small diameter fiber extending between the larger unchanged ends of the rod. The rod transitions or necks down from the full diameter ends to the small diameter center fiber. The transitions occur in an unpredictable manner according to the uniformity of heat distribution in the center section of the quartz rod, the amount of heat energy in the center section prior to stretching, the rate at which the solid rod is stretched, and the viscosity of the heated center portion from which the fiber is formed, among other variables. The fiber itself is not of a uniform diameter, because the stretching occurs in an uncontrolled manner. The necked down transition portions between the full diameter ends of the rod and the center fiber are also variable in characteristics, due to the transitions occurring in an uncontrolled manner.

As a consequence of these uncontrolled variables, the length (L) of the pendulum arm is not predictable, and the flex characteristics of the flexure are also unpredictable. The necked down transition portions do not precisely demarcate points which establish the length (L) of the fiber which forms the pendulum arm. The thinnest portions of the necked down transition portions adjacent to the fiber may flex slightly along with the fiber, thereby varying the length (L) of the pendulum arm. Furthermore, the nonuniform diameter or thickness of the fiber itself will have different flexure characteristics.

These idiosyncratic aspects of known prior art quartz pendulum arm flexures are not of principal concern in those pendulum devices which utilize only a single pendulum supported by a single flexure. The operating characteristics of the pendulum device are adapted to the unique characteristics of the single flexure. However, in pendulum devices which require two flexures to support a single bob, or in pendulum devices which use two separate pendulums operating at the same oscillation frequency, it is important that multiple pendulum arm flexures have substantially the same length, flex and resonant operating characteristics. Pendulum arm flexures having substantially the same length, flex and resonant operating characteristics achieve predictable oscillatory behavior. Using pendulum arm flexures which have significantly different length, flex and resonant operating characteristics result in undesirable modes of movement of a single pendulum supported by two flexures. The undesirable modes of movement consume additional energy and adversely affect the desired operation of the pendulum. In addition, in double or multiple pendulum devices, significantly different length, flex and resonant operating characteristics of multiple pendulum arm flexures create substantial difficulties in attempting to coordinate and synchronize the motions of multiple pendulums, or may make synchronized operation achievable only when accompanied by substantial and undesirable energy loss.

SUMMARY OF THE INVENTION

The pendulum arm flexure of the present invention is made from quartz or other energy-conserving material, and has a definite length (L) and a substantially uniform diameter fiber extending between opposite ends to which holders are attached. As a consequence of these characteristics, the length, flex and resonant operating characteristics of the flexure are predictable and therefore reproducible in multiple substantially identical ones of the pendulum arm flexures, each of which has substantially identical operating characteristics. Two of these substantially identical pendulum arm flexures may be used effectively to suspend a single bob in single pendulum device. Multiple ones of these substantially identical pendulum arm flexures may be used to suspend the bobs of multiple pendulums in a multiple pendulum device. The definite and determinable operating characteristics of the pendulum arm flexure of the present invention minimize or eliminate undesirable modes of motion which consume additional oscillating energy of the pendulum. The definite and determinable operating characteristics of the pendulum arm flexure reduce the need, and components required, to add energy to an oscillating pendulum, thereby simplifying the operation of the pendulum. The present invention also involves a method of constructing such a pendulum arm flexure having these desirable characteristics.

In accordance with these considerations, one principal aspect of the invention is a pendulum arm flexure for supporting a pendulum bob from a support structure. The flexure comprises an elongated fiber having opposite ends, and a holder connected at each opposite end of the elongated fiber. One holder is adapted to rigidly connect the pendulum arm flexure to either the pendulum bob or the support structure, and the other holder is adapted to rigidly connect the pendulum arm flexure to the other one of the pendulum bob or the support structure. Each holder includes an inner end adjacent to the fiber, and the fiber extends continuously between the inner ends of the holders. The inner end of each holder has a larger cross-sectional size than the cross-sectional size of the adjacent fiber. The inner end of each holder transitions abruptly in cross-sectional size relative to the cross-sectional size of the connected fiber. The fiber has a precise length measured between the abrupt transitions at the inner ends of the opposite holders. The fiber has resiliency characteristics which permit flexing along the length of the fiber between the inner ends of the holders during oscillation of the pendulum. Each holder has rigidity characteristics which prevent flexing of the holder at its inner end during oscillation of the pendulum. The fiber is formed of energy conserving material which temporarily stores energy expended in flexing the fiber in one direction as intermolecular force and then releases the stored energy when the fiber flexes in the opposite direction.

Other aspects of the pendulum arm flexure include some or all the following described features. The fiber has a substantially uniform cross-sectional size between the inner ends of the opposite holders. The resiliency characteristic of the fiber is substantially uniform along the length of the fiber between the inner ends of the holders. An electrically conductive coating covers the fiber and each holder. Each holder is integrally connected to the fiber, such as by integral fusion. The fiber and both holders are separately formed before each holder and the fiber are integrally fused together. The fiber and both holders are formed of the same material, which is preferably capable of viscously flowing upon the application of sufficient heat, such as a glass or quartz material.

Another principal aspect of the invention is a method of constructing a pendulum arm flexure which supports a pendulum bob from a support structure, in which the pendulum arm flexure comprises an elongated fiber having opposite ends and a holder located at each opposite end of the elongated fiber, with each holder adapted to connect the pendulum arm flexure to one of the pendulum bob or the support structure. The method comprises forming first and second holders separately from one another and from an elongated fiber, connecting the first holder to one end of the fiber and connecting the second holder to the other end of the fiber at a predetermined distance from the first holder to establish the length of the pendulum arm flexure which will undergo oscillation.

Other subsidiary aspects of the construction method include some or all of the following described features. Each holder is integrally connected to the ends of the separate fiber, by for example, fusing each holder and the fiber. The holders and the fiber are formed of the same material, such as quartz, which is capable of fusion upon the application of sufficient heat. Each holder is formed to include an opening within which to receive the one end of the fiber, the end of the fiber is inserted into the opening of each holder, and the holder and the end of the fiber inserted the opening are fused to integrally connect each holder to each end of the fiber. The holder and the end of the fiber are fused by the application of heat sufficient to melt the holder and the fiber while directing a stream of cover gas over the fiber adjacent to the inner end of each holder to cool the fiber and prevent melting of the fiber adjacent to the holder. The fiber is formed to have a substantially uniform cross-sectional size along its length between the holders. A center section of a rod of material from which the fiber is formed is heated sufficiently to make the center section of the rod viscous and flowable, and opposite ends of the rod are moved away from one another at a substantially constant rate to draw the viscous center section of the rod into an elongated and substantially uniform and reduced cross-sectional length of material, from which the fiber is obtained. Opposite ends of the rod are moved away from one another at a substantially constant rate by suspending the rod vertically above a hollow tube of electrically conductive material, attaching a magnet to the lower end of the vertically suspended rod, and moving the end of the heated rod into the tube at a substantially constant rate established by eddy currents induced in the electrically conductive tube which create a magnetic force that counteracts force from the magnet and causes the magnet to move downward at a substantially constant rate. The exterior of the flexure may be coated with an electrically conductive material.

A more complete appreciation of the present invention and its scope may be obtained from the accompanying drawings, which are briefly summarized below, from the following detailed description of presently preferred embodiments of the invention, and from the appended claims.

DETAILED DESCRIPTION

Figure 1:
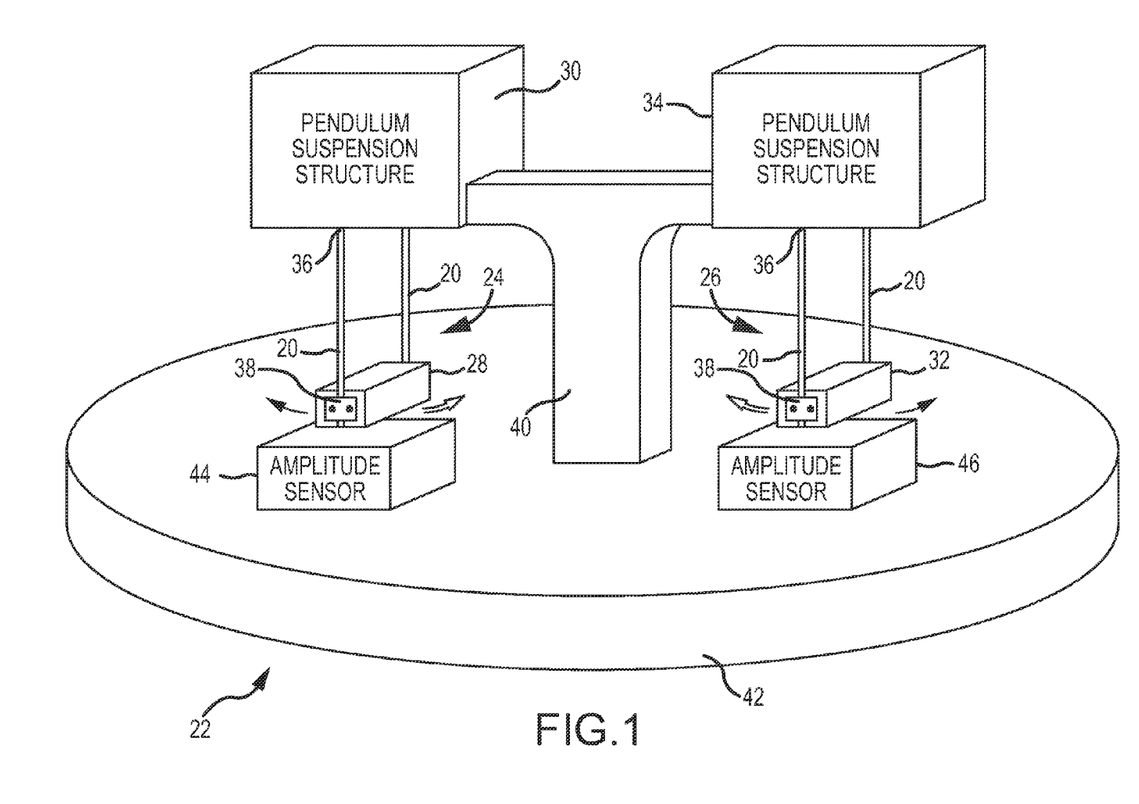
FIG. 1 is a perspective block and generalized component illustration of a double pendulum device which incorporates multiple ones of the pendulum arm flexures of the present invention.

Four pendulum arm flexures 20, each of which incorporates the present invention, are used in a double pendulum device 22 shown in FIG. 1. The double pendulum device 22 may be a gravimeter used to measure gravity (g), or a clock used to measure intervals of time (T) or to establish a frequency (f). An example of a double pendulum device 22 used as a gravimeter is described in the above cross-referenced U.S patent application.

The double pendulum device 22 includes a first pendulum 24 and a second pendulum 26. The first pendulum 24 comprises a pendulum bob 28 and two pendulum arm flexures 20 which suspend the pendulum bob 28 from a pendulum suspension structure 30. The second pendulum 26 comprises a pendulum bob 32 and two pendulum arm flexures 20 which suspend the pendulum bob 32 from a pendulum suspension structure 34. One end of each pendulum arm flexure 20, the upper end 36 as shown in FIG. 1, is connected to one of the pendulum suspension structures 30 or 34. The other end of each pendulum arm flexure 20, the lower end 38 as shown in FIG. 1, is connected to one of the bobs 28 or 32. In this manner, two pendulum arm flexures 20 support each pendulum bob 28 and 32 from each pendulum suspension structure 30 and 34. Both pendulum suspension structures 30 and 34 are connected to a support post 40 which extends from and forms part of a rigid base 42 of the device 22.

The upper ends 36 of the two flexures 20 associated with each pendulum 24 and 26 are rigidly connected to the suspension structures 30 and 34. The lower ends 38 of the two flexures 20 associated with each pendulum 24 and 26 are rigidly connected to respectively opposite ends of the bobs 28 and 32. The points of connection of the upper ends 36 of the flexures 20 to the pendulum suspension structures 30 and 34, and the points of connection of the lower ends 38 of the flexures 20 to the bobs 28 and 32, cause the pendulums 24 and 26 to swing or oscillate in a common plane of oscillation. Preferably, the pendulums 24 and 26 oscillate 180° out of phase with one another, meaning that when the pendulum 24 reaches its maximum amplitude point in its arc of oscillation on the left (as shown), the pendulum 26 reaches its maximum amplitude in its arc of oscillation on the right (as shown), and vice versa. The maximum amplitude points of the pendulum bobs 28 and 32 in their arcs of oscillation are sensed by amplitude sensors 44 and 46, respectively, both of which are attached to the base 42. Although the bobs 28 and 32 are shown supported below the suspension structures 30 and 34, the flexures 20 could also be suspend the bobs above suspension structures in appropriate circumstances.

The length, flexure and resonant operating characteristics of the pendulum arm flexures 20 are substantially identical in accordance with the present invention, as discussed in greater detail below. The weight and center of mass distribution of the pendulum bobs 28 and 32 are also substantially identical. Consequently, the pendulums 24 and 26 experience substantially identical natural or resonant oscillation characteristics. The substantially identical natural resonant oscillation characteristics of each pendulum 24 and 26 causes one pendulum 24 or 26 to oscillate at a frequency (f) or period (T) which is substantially identical to the frequency or period of the other pendulum 26 or 24.

When oscillating at their natural resonant frequencies, the pendulums 24 and 26 conserve the maximum amount of oscillation energy. Stated alternatively, the pendulums 24 and 26 minimize the loss of oscillation energy when operating at their natural resonant frequencies. The natural resonant frequency energy storage and loss characteristic of any resonant system is defined by a term referred to as "Q".

When operating at a high Q, a resonant system conserves the maximum amount of the resonant energy and minimizes the loss of oscillating energy.

The pendulums 24 and 26 preferably have substantially identical high Q's and natural resonant frequencies. The pendulums 24 and 26 swing in substantially identical arcs of oscillation, maintain substantially identical maximum amplitude points, and do so while losing a minimum amount of oscillation energy from the unavoidable frictional energy loss associated with any moving mechanical system. These desirable characteristics result in major part from the consistent, predictable and reproducible characteristics of each pendulum arm flexure 20.

More details concerning each pendulum arm flexure 20 are shown in FIGS. 2-5. The pendulum arm flexure 20 comprises a holder 50 at each end 36 and 38 of the flexure 20. The holders 50 are adapted to connect the ends 36 and 38 to a pendulum bob (e.g, 28 or 32, FIG. 1) and to a suspension structure (e.g., 30 or 34, FIG. 1). A fiber 52 extends between the opposite ends 36 and 38 of the holders 50. The fiber 52 is formed from material, such as quartz (fused silica), which provides a high degree of energy conservation due to the storage and release of intermolecular forces when the material is mechanically flexed or bent and then released to resume its initial non-flexed position. Preferably, the holders 50 are also formed of the same type of material as the fiber 52. A further desirable characteristic of this type of energy-conserving material is a capability to become viscous, flow and melt upon the application of sufficient heat, as discussed below.

The fiber 52 has a substantially uniform diameter and substantially uniform material characteristics along its length between the holders 50. The fiber 52 flexes when the pendulum swings in its arc of oscillation. The holders 50 do not flex to any significant degree when the pendulum swings in its arc of oscillation, because the holders 50 are themselves rigid and rigidly connected to the pendulum suspension structures 30 and 34 and to one of the pendulum bobs 28 and 32.

Figure 3:
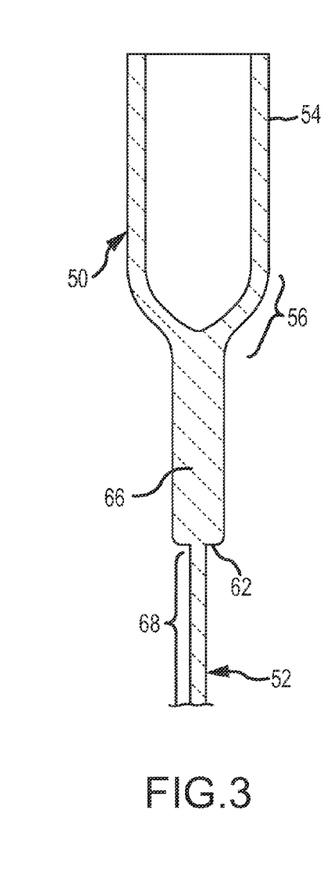
FIG. 3 is an enlarged axial section view of one end of the pendulum arm flexure shown in FIG. 2.
Figure 4:
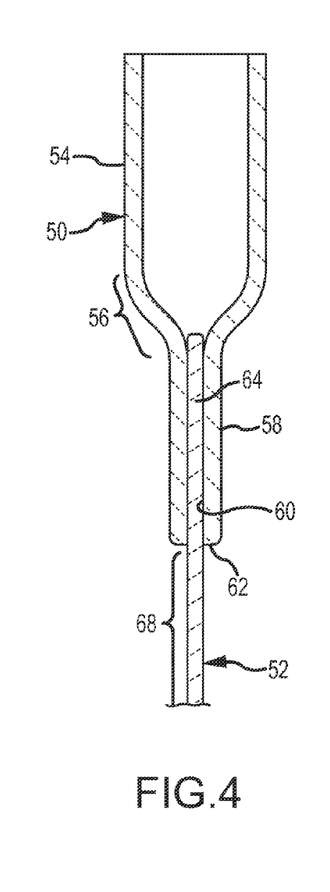
FIG. 4 is an enlarged axial section view of the end of the pendulum arm flexure shown in FIG. 3, prior to fusing a fiber in a retainer portion of a holder to form the integral flexure shown in FIGS. 2 and 3.
Figure 5:
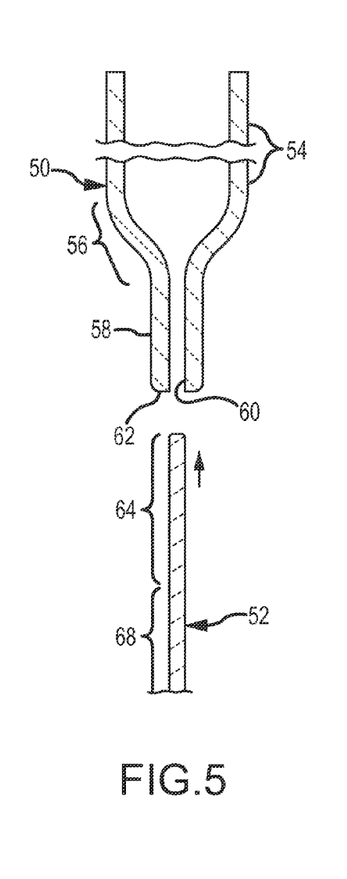
FIG. 5 is a partial enlarged axial section view similar to FIG. 4, showing a holder and an end of a fiber prior to inserting the end of the fiber into the holder and prior to integrally fusing those components together to create the flexure shown in FIGS. 2 and 3.

Each holder 50 has a uniform diameter tubular portion 54 located at its outer end. A middle portion 56 of each holder 50 is formed as a hollow frustoconical-shaped or necked-down transition which extends inward from the tubular portion 54 toward an inner tubular retainer portion 58 of each holder 50. The retainer portion 58 extends inward from the transitional portion 56 and connects to the fiber 52. Initially, before the fiber 52 is connected to the tubular retainer portion 58, a small axial opening 60 extends from an inner end 62 of the retainer portion 58 into the transitional portion 56 (FIGS. 4 and 5). An outer end 64 of the fiber 52 is inserted into the axial opening 60 (FIG. 4). The retainer portion 58 is heated until it and the outer end 64 of the fiber 50 melt and fuse together into an integral solid mass 66 (FIG. 3). The integral fusion of the end 64 of the fiber 52 and the retainer portion 58 makes the end 64 of the fiber 52 integrally and rigidly a part of the holder portion 50. In this manner, the fiber 52 is rigidly and integrally joined to each holder 50, as shown in FIG. 3.

Due to its integral connection to the retainer portion 58 of the holder 50, the outer end 64 of the fiber 52 is not able to flex relative to the retainer portion 58 or relative to the holder 50. Flexing of the fiber 52 is only possible beginning at the point where the fiber 52 adjoins the inner end 62 of the retainer portion 58 and along the length of the fiber 52 to the point adjoining the inner end 62 of the retainer portion 58 of the holder 50 at the opposite end of the flexure 20. The fiber 52 flexes only between the inner ends 62 of the retainer portions 58 of the opposite holders 50 (FIG. 2), due to the rigid connection of the holders 50 to the pendulum bobs and to the suspension structures.

Figure 2:
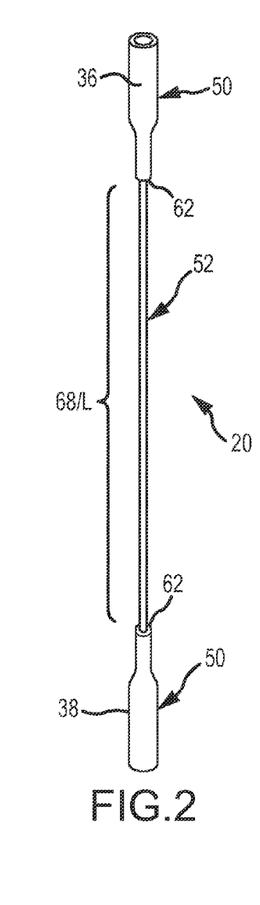
FIG. 2 is a perspective view of one pendulum arm flexure shown in FIG. 1 and which incorporates the present invention.

The specific positions of the inner ends 62 of the holders along the length of the fiber 52 precisely define the effective oscillation length (L) of the pendulum arms along which flexure occurs. The length of the pendulum arm (L) is precisely and definitely established by a center portion 68 of the fiber 52 extending between the distinct inner ends 62 of the retainer portions 58 of the oppositely positioned holders 50. The length of the center portion 68 of the fiber 52 between the opposite ends 62 of the retainer portions 58 is precisely set before fusing the end 64 of the fiber 52 and the retainer portion 58 of the second holder 50 of the flexure 20. The length (L) of the pendulum is controlled by the extent to which the center portion 68 is exposed after inserting and fusing the end 64 of the fiber 52 in the axial opening 60. Controlling the length (L) of the flexure 20 in this manner allows multiple ones of the pendulum arm flexures 20 to be constructed having substantially identical lengths (L).

Figure 6:
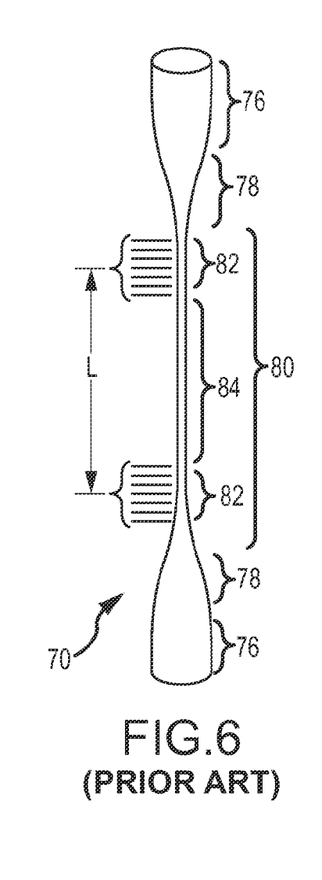
FIG. 6 is a perspective view of a prior art pendulum arm flexure with respect to which the present invention is an improvement.
Figure 7:
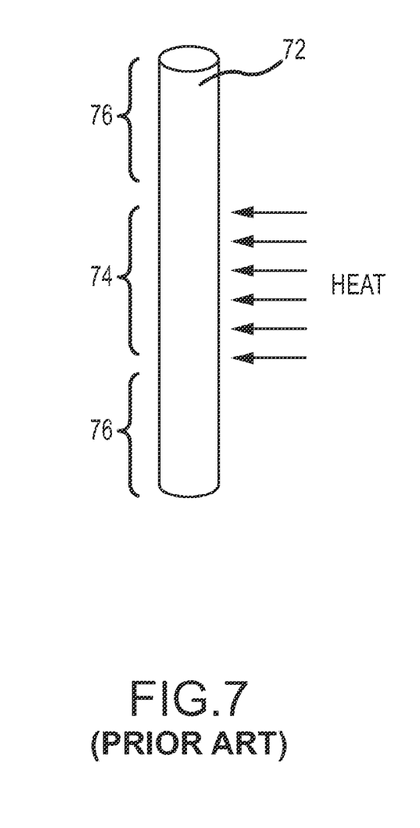
FIG. 7 is a perspective view of a rod from which the prior art pendulum shown in FIG. 6 is constructed.
Figure 8:
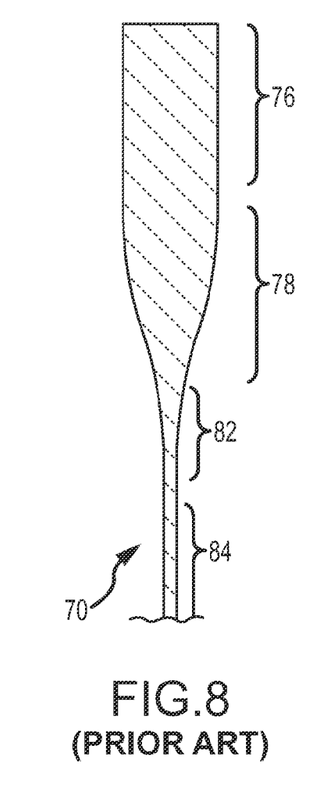
FIG. 8 is an enlarged axial section view of one end of the prior art pendulum arm flexure shown in FIG. 6.

In contrast to the precise and controllable length (L) of the fiber 52 of the flexure 20 (FIG. 2), a known prior art flexure 70, shown in FIGS. 6 and 8, exhibits an effective oscillation length (L) which is significantly indeterminable. The prior art flexure 70 is formed from a single integral rod 72 of quartz material, shown in FIG. 7. A center portion 74 of the rod 72 is heated until it becomes viscous and flowable, which allows cylindrical ends 76 of the rod 72 to be separated and pulled in opposite directions, thereby drawing the viscous center portion 74 into two opposite frustoconically shaped transitional portions 78 between which a considerably smaller diameter center fiber 80 extends. The center fiber 80 continues in a portion 82 which diminishes further in diameter from the transitional portion 78, until ultimately a center portion 84 of the fiber 80 reaches a somewhat consistent diameter over some indeterminate length. The entire prior art flexure 70 is formed simultaneously in this manner.

The two transitional portions 78 are variable and nonuniform in their thickness and length characteristics. The diminishing-diameter portions 82 of the center fiber 80 are also variable and nonuniform in their thickness and length. The variability in thickness arises from the lack of precise control in drawing the viscous center portion 74 of the rod 72 into the transitional portions 78, the portion 82 and the center fiber 84. Most importantly, however, the variable transitional portions 78 and the diminishing-diameter portions 82 do not precisely establish the beginning and ending points at which the fiber 80 flexes. Flexure may occur in some indeterminate location within the transitional portions 78 and/or in the diminishing-diameter portions 82. Without such a specific point at which the fiber 80 is allowed to flex, it is impossible to determine with precision the effective length (L) of the flexure 70 during oscillation, as shown graphically in FIG. 6.

Another category of problems associated with the prior art flexure 70 is that its resonant oscillatory characteristics are substantially indeterminable. The flexible transitional portions 78 and the diminishing-diameter portions 82 of the fiber 80 vary in thickness or diameter, and that variability introduces different flexure characteristics in those portions 78 and 80 compared to the more uniform flexing characteristics of the center portion 84 of the fiber 80. The variability in thickness of the flexing portions 78 and 82 of the flexure 70 create different mechanical flex characteristics, which leads to variability in the natural resonant frequency characteristics of the flexure 70. These variable characteristics make it very difficult or impossible to predict the oscillating characteristics of the prior art flexure 70.

A prior art pendulum arm flexure 70 of the type shown in FIG. 6 will perform satisfactorily in a pendulum which utilizes only a single such flexure 70 to support a pendulum bob. In those circumstances, the flexure and natural resonant frequency operating characteristics of the flexure 70 are simply measured, and then the remaining aspects of the pendulum are adapted to the measured characteristics of the flexure 70. In other words, the operating characteristics of the pendulum device are adapted to the unique characteristics of the pendulum arm flexure. In the case of a single flexure-single bob pendulum device, consistency in the characteristics of the pendulum arm flexure is not necessarily essential.

On the other hand, a prior art pendulum arm flexure 70 is not satisfactory for use where multiple pendulum arm flexures are used to support a single pendulum bob, or where multiple pendulums must oscillate in synchronization with one another, or where the pendulum device requires or depends upon predictable length, flex and natural resonant frequency operating characteristics of the pendulum arm flexure. To obtain optimal performance in such situations, each pendulum arm flexure should have substantially identical and predictable length (L) and natural resonant frequency operating characteristics. Without such substantially predictable characteristics, the oscillation of a single pendulum bob supported by two flexures will not oscillate in the desired manner with minimum loss of oscillation energy, and/or the two pendulums will not oscillate in synchronization with one another with minimum loss of oscillation energy. Excessive energy loss becomes a substantial and significant problem in the use of these prior pendulum devices.

The pendulum arm flexure 20 of the present invention solves these problems by having a substantially predictable effective length (L) and predictable flexure and natural resonant frequency characteristics. As a consequence, the present invention permits the construction of multiple substantially identical pendulum arm flexures 20 on a repeatable, predictable and consistent basis, thereby assuring that the pendulum devices in which multiple ones of those flexures 20 are utilized will operate as desired with minimal loss of oscillating energy.

Figure 11A:
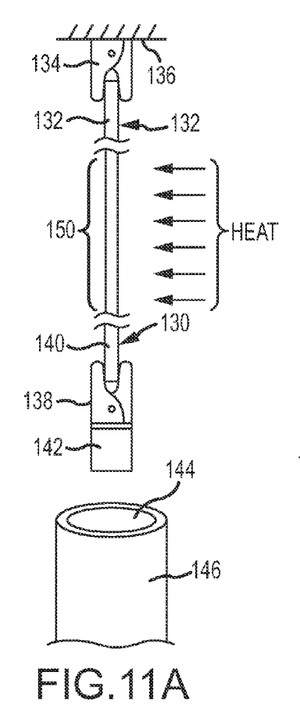
FIGS. 11A-11C are perspective, axial section, enlarged and partial sequential views which illustrate actions performed to construct a fiber of the pendulum arm flexure shown in FIGS. 2-5.
Figure 11B:
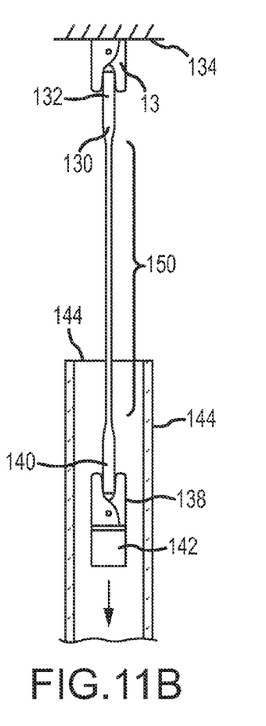
Figure 11C:
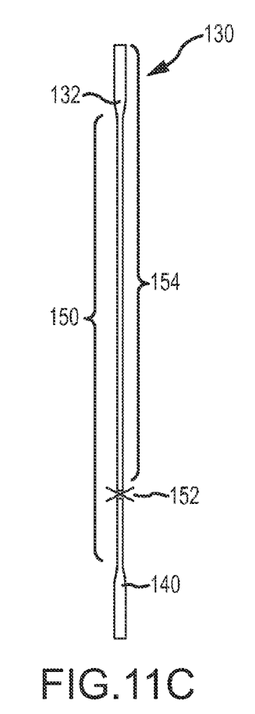
Figure 12A:
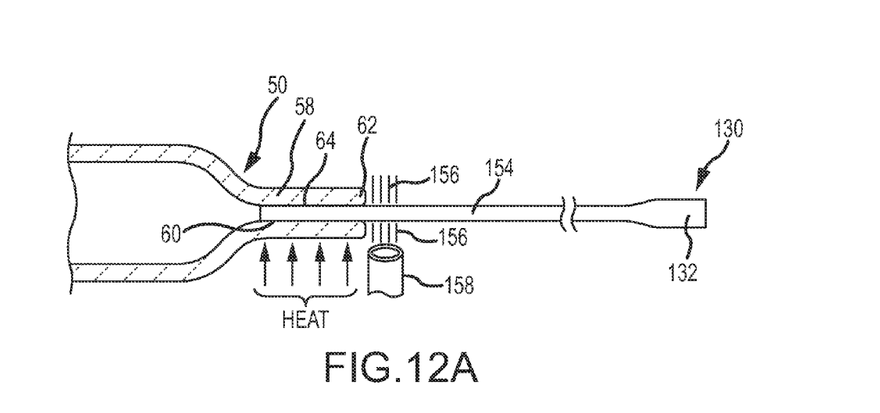
FIGS. 12A-12C are perspective, axial section, enlarged and partial sequential views which illustrate actions performed on the holder illustrated in FIGS. 10A-10J and the fiber illustrated in FIGS. 11A-11C, to connect the holder and the fiber as shown in FIGS. 2 and 3.
Figure 12B:
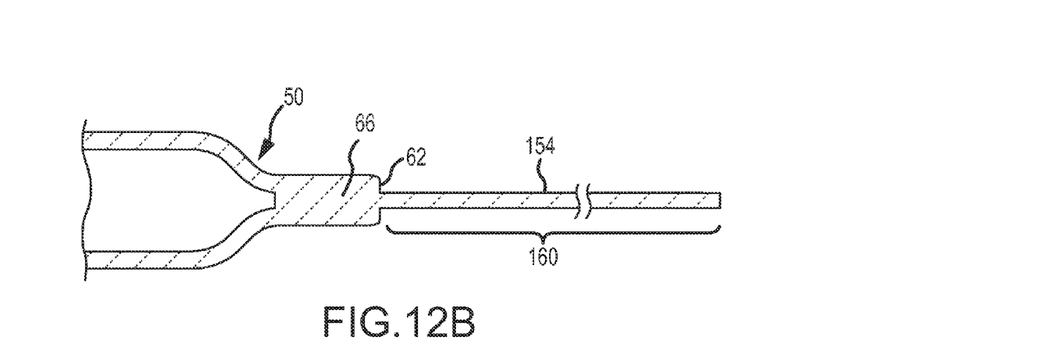
Figure 12C:
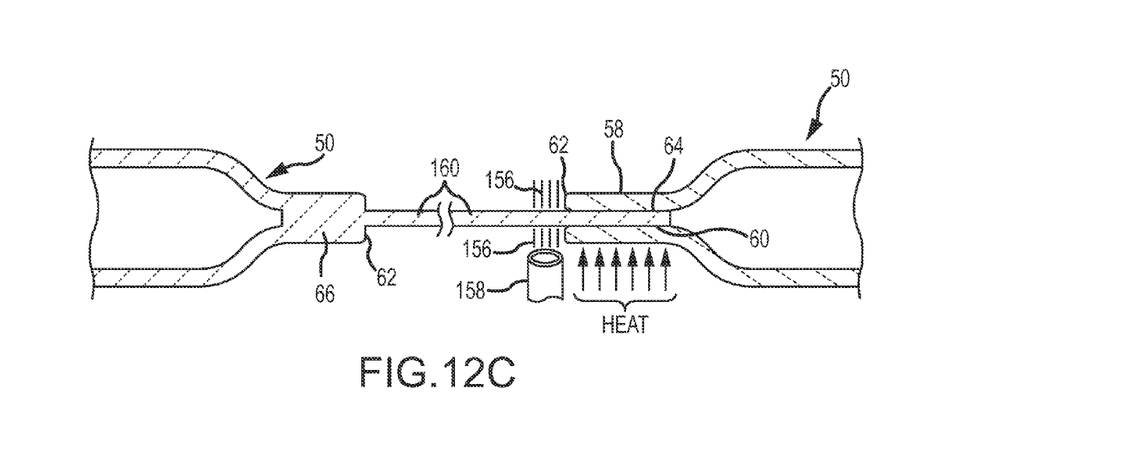
Figure 13A:
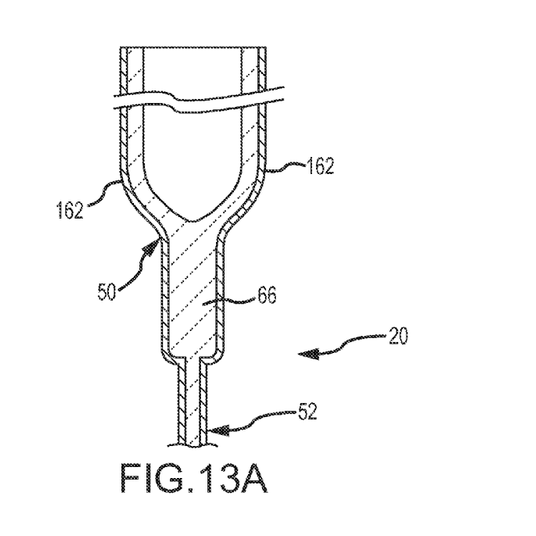
FIG. 13A is a partial view similar to FIG. 3, showing an electrically conductive coating applied to the exterior of the pendulum arm flexure shown in FIGS. 2 and 3.
Figure 13B:
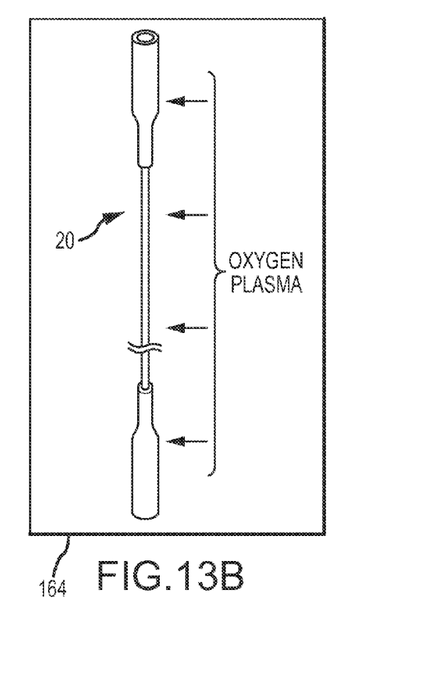
FIGS. 13B and 13C are generalized illustrations of actions taken to apply the electrically conductive coating shown in FIG. 13A.
Figure 13C:
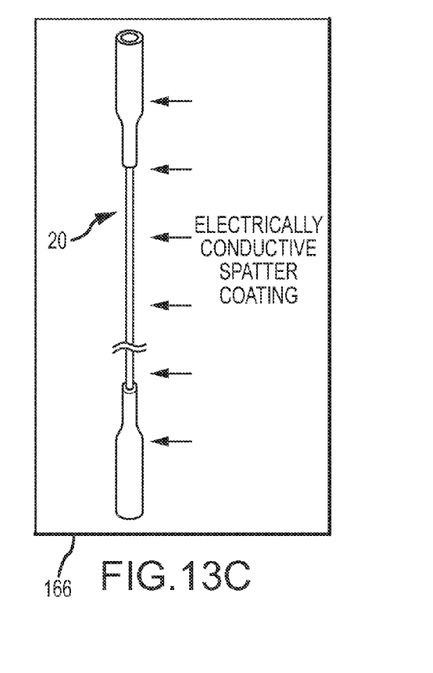

A method of constructing each pendulum arm flexure 20 to yield consistent and predictable characteristics entails separately constructing two holders 50 and a single fiber 52 (FIGS. 4 and 5) and then joining them together to form the flexure 20 (FIG. 2). FIGS. 10A-10J illustrate the construction of one holder 50. The other holder 50 of the flexure 20 is formed in the same manner. FIGS. 11A-11C illustrate the construction of a single fiber 52. FIGS. 12A-12C describe joining the two holders 50 to the fiber 52 to form the flexure 20 (FIG. 2). FIGS. 13A-13C describe placing an electrically conductive coating on the exterior of the flexure 20 (FIG. 2).

Figure 9:
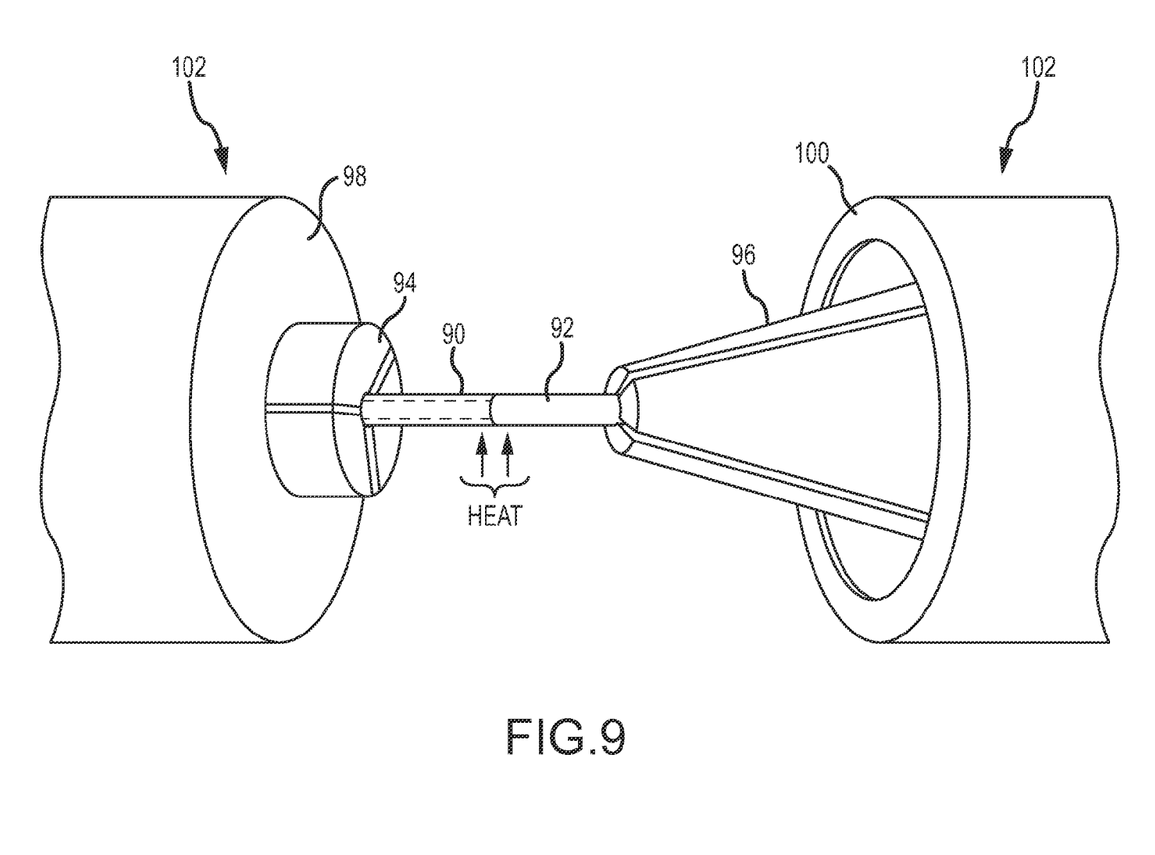
FIG. 9 is a generalized perspective view of a glass lathe holding a tube and a rod upon which actions are performed to construct the pendulum arm flexure shown in FIGS. 2-5.

Construction of the holder 50 commences, as shown in FIG. 9, by fusing an end of a quartz tube 90 to a solid quartz rod 92. The fusion preferably occurs while the tube 90 and the rod 92 are held in chucks 94 and 96 of spindles 98 and 100, respectively, of a conventional glass lathe 102. The spindles 98 and 100 are sometimes referred to as the headstock and tailstock of the lathe, respectively. The spindles 98 and 100 rotate coaxially about a single working axis of the lathe 102, and the chucks 94 and 96 hold one or two workpieces and rotate them about that working axis. As shown in FIG. 9, the tube 90 and rod 92 constitute the workpieces. One of the spindles is movable longitudinally along the working axis, to move the workpiece held by that spindle axially relative to the workpiece held by the other spindle. The flexure 24 is preferably constructed by actions performed by using the glass lathe 102, as described in connection with FIGS. 10A-10J and 12A-12C.

The ends of the tube 90 and the rod 92 are brought into contact with one another, by movement of the spindle 100 toward the spindle 98. Heat from a heat source such as an methane-oxygen flame or a laser is directed onto the contacting ends and adjacent portions of the tube 90 and the rod 92. Sufficient heat is applied to melt and fuse together the contacting ends of the tube 90 and the rod 92, causing the tube 90 and the rod 92 to be integrally connected to one another. The heat for fusing the tube 90 and the rod 92 together is applied while the tube 90 and the rod 92 are rotated by the spindles 98 and 100, thereby uniformly distributing the heat and uniformly fusing together the ends of the tube 90 and the rod 92. The fused-together tube and rod are thereafter allowed to cool to room temperature.

Figure 10A:
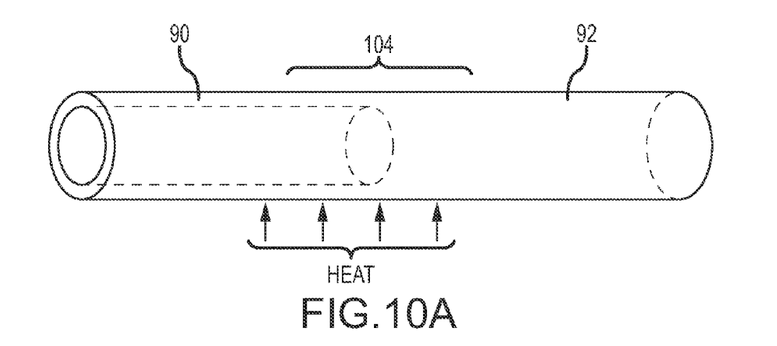
FIGS. 10A-10J are perspective, axial section, enlarged and partial sequential views which illustrate actions performed on the tube and the rod shown in FIG. 9 to construct a holder shown in FIGS. 4 and 5 of the pendulum arm flexure shown in FIGS. 2 and 3.

Next, as shown in FIG. 10A, heat from a methane-oxygen flame or laser is applied to heat a center portion 104 of the fused-together ends of the tube 90 and rod 92. The heat is applied while the fused-together tube 90 and rod 92 are rotating in the glass lathe 102 (FIG. 9), thereby evenly distributing the heat throughout the center portion 104. Sufficient heat is applied to make the center portion 104 viscous and flowable.

Figure 10B:
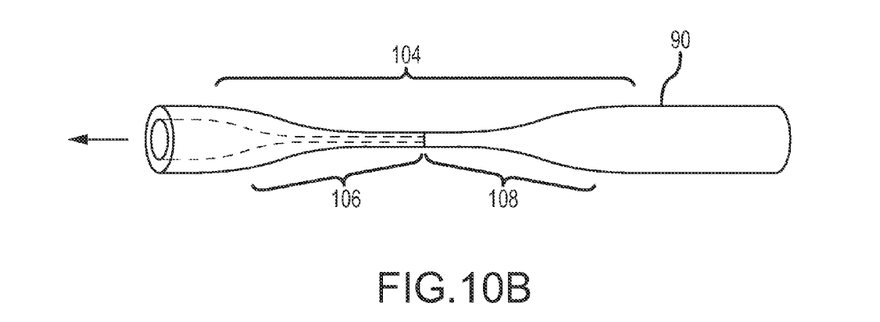

Thereafter as shown in FIG. 10B, the opposite ends of the fused together tube 90 and rod 92 are moved axially away from one another by separating the spindles 98 and 100 from one another (FIG. 9), thereby extending the length of the viscous center portion 104 of the tube 90 and simultaneously drawing it radially inward into a frustroconically shaped necked down tube portion 106 and a frustroconically shaped necked down solid portion 108. The necked down tube portion 106 is hollow to the location where the tube 90 was fused to the rod 92 (FIGS. 9 and 10), and the necked down solid portion 108 is complete integral material since it was formed from the rod 92. The necked down portions 106 and 108 are thereafter allowed to cool to room temperature.

Figure 10C:
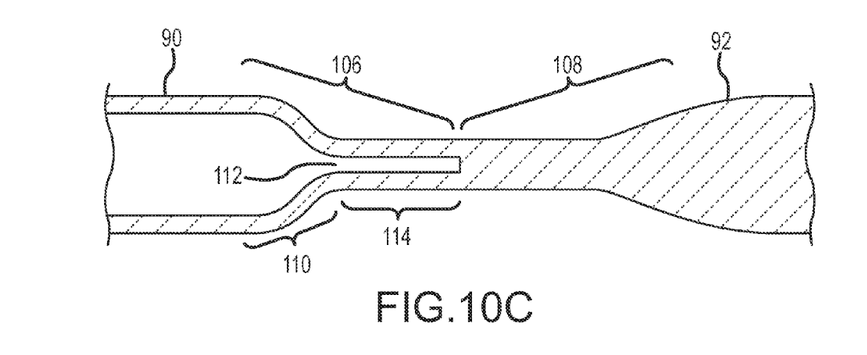

The necked down tube portion 106 is then heat worked to thicken a shoulder area 110 of the necked down portion 106 and to reduce the internal diameter of an axial opening 112 through a neck area 114 of the necked down portion 106, as shown in FIG. 10C, while the tube 90 and rod 92 rotate in the glass lathe 102 (FIG. 9). Applying heat to the necked down tube portion 106 while rotating it in the glass lathe causes the viscous glass to accumulate in the shoulder area 110 and in the neck area 114, due to surface tension of the viscous material. Consequently, the amount of material in a shoulder area 110 and in the neck area 114 increases. The increased material in the neck area 114 reduces the diameter of the axial opening 112. The configuration shown in FIG. 10C is allowed to cool to room temperature.

Figure 10D:
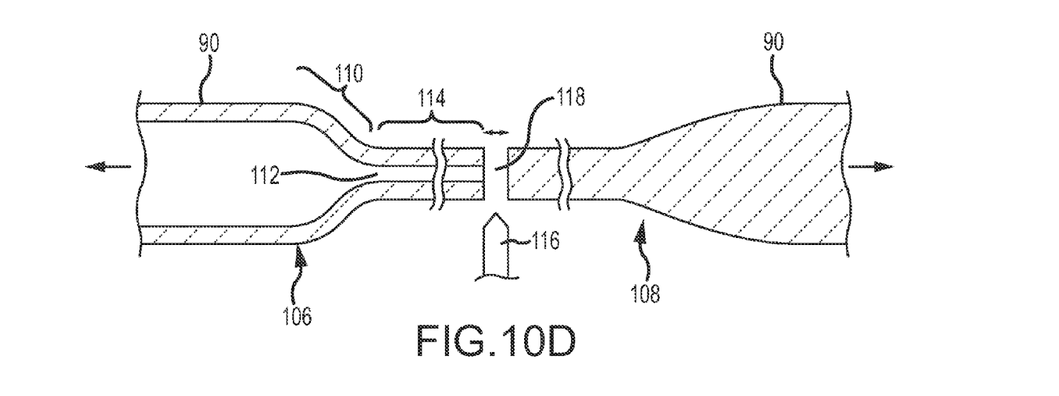

The necked down tube portion 106 is then cut away from the necked down solid portion 108, as shown in FIG. 10D. Cutting is accomplished by scoring the neck area 114 with a diamond cutter 116 at a location 118 on the neck area 114 adjacent to the end of the necked down solid portion 108 while the tube 90 and rod 92 rotate in the glass lathe 102 (FIG. 9), and then applying axial separation force from the spindles 98 and 100 (FIG. 9) to separate the neck area 114 from the necked down solid portion 108 at the scored location 118. The location for scoring the neck area 114 and separating the necked down portions 106 and 108 should be measured from the shoulder area 110 to extend about 30-50% more than the desired final axial length of the retainer portion 58 (FIGS. 4 and 5). The separated necked down tube portion 106 is thereafter used to create one holder 50 (FIGS. 4 and 5) as further described below.

Figure 10E:
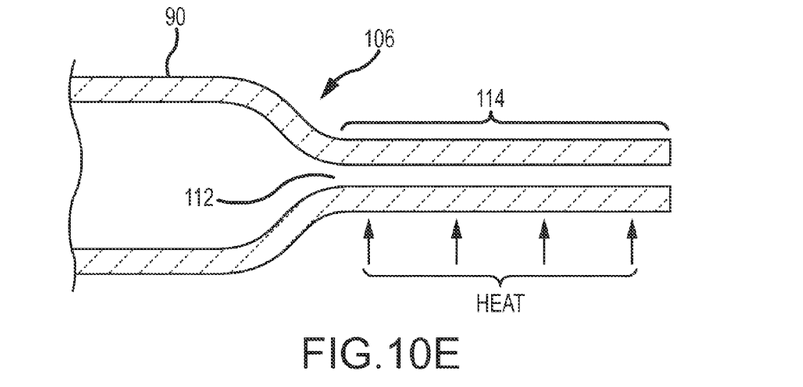
Figure 10F:
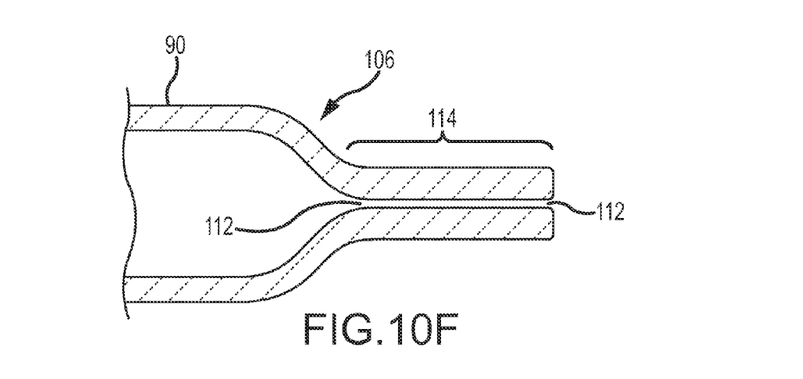

Next, as shown in FIG. 10E, heat is applied to the neck area 114 of the necked down tube portion 106, until the neck area 114 becomes viscous. The viscous material in the heated neck area 114 accumulates and reduces the length of the neck area 114 and increases the thickness of the walls of the neck area 114 to reduce the inside diameter of the axial opening 112 through the neck area 114, as shown in FIG. 10F. The heat is applied to accumulate the viscous material in the neck area 114 until the diameter of the axial opening 112 is reduced to the desired diameter of the final size of the axial opening 60 in the retainer portion 58 (FIGS. 4 and 5). In a preferred embodiment described herein, the desired diameter of the axial opening 112 is approximately 50 microns ($\mu$). Preferably a video camera with visual enlargement and measurement capabilities is used to visualize the effects and gauge the diameter of the axial opening 112 as the heat is applied.

Figure 10G:
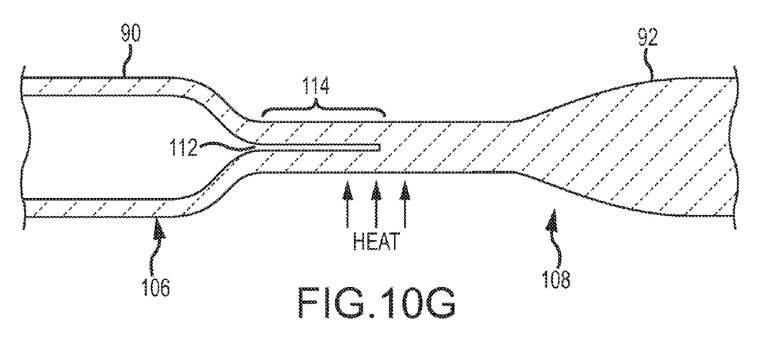

Thereafter, as shown in FIG. 10G, the necked down tube portion 106 with its shortened and reduced internal diameter neck area 114 (FIG. 10F) is reattached by heat fusion to the necked down rod portion 108 from which it was previously separated (FIG. 10D). Attachment in this manner allows the necked down tube portion 106 with its shortened and reduced internal diameter neck area 114 to be cut at the desired length of the retention portion 58 (FIGS. 4 and 5).

Figure 10H:
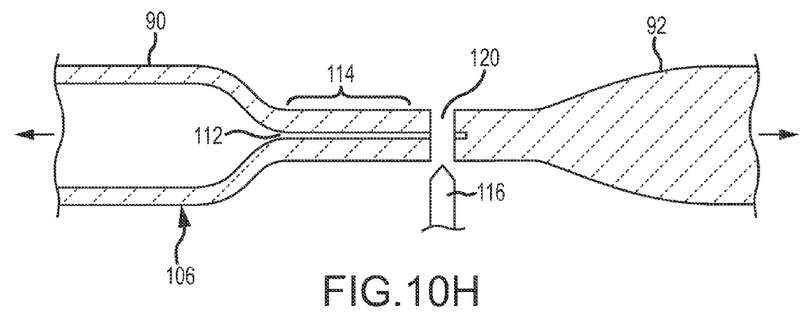

Cutting the shortened and reduced internal diameter neck area 114 of the necked down tube portion 106 to the desired length of the retention portion 58 (FIGS. 4 and 5) is illustrated in FIG. 10H. The desired length is measured at location 120, and the rotating neck area 114 is scored lightly with very light contact from the diamond cutter 116, while the attached necked down tube portion 106 and the necked down rod portion 108 rotate in the glass lathe. A small amount of liquid, preferably water, is applied at the scored location 120, and the spindle 100 of the glass lathe 102 (FIG. 9) is moved slightly axially relative to the spindle 98 to separate the necked down tube portion 106 from the necked down rod portion 108 at the scored location 120.

Figure 10I:
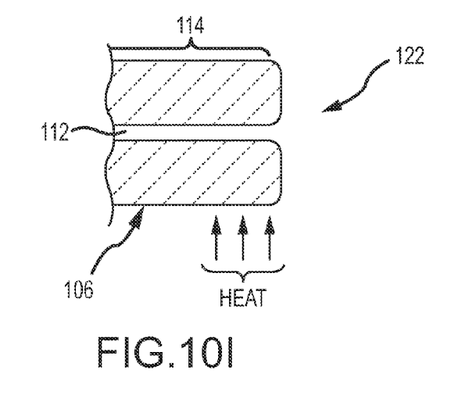

The end 122 of the separated neck area 114 is thereafter heat or flame polished, as shown in FIG. 10I. The heat from the polish gathers any slight projections or irregularities of material resulting from mechanically separating the necked down tube portion 106 from the necked down rod portion 108 (FIG. 10H). Any slight projections or irregularities surrounding the reduced internal diameter axial opening 112 are thereby removed, to prevent those slight projections from inhibiting the insertion of the fiber 52 into the axial opening 60 when the flexure 20 is constructed (FIGS. 4 and 5). As a result of the actions described in conjunction with FIG. 10I, the neck area 114 of the necked down tube portion 106 assumes the final configuration of the retainer portion 58 of the holder 50 (FIGS. 3-5). The thickened shoulder area 110 of the necked down tube portion 106 has previously assumed the final configuration (FIG. 10C) of the transitional portion 56 of the holder 50 (FIGS. 2-5).

Figure 10J:
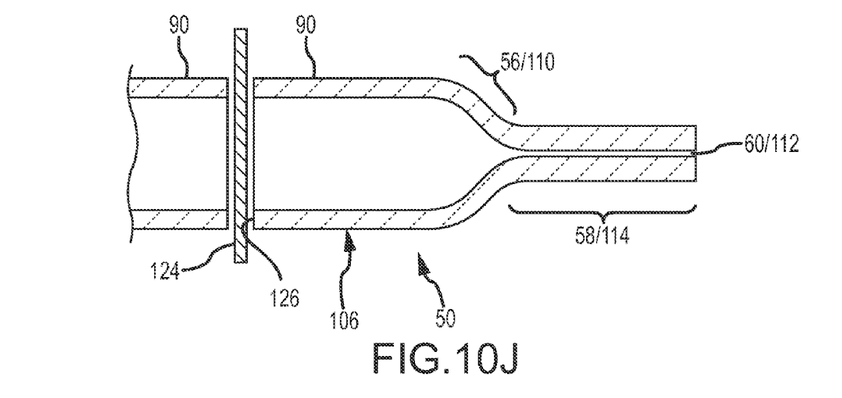

The holder 50 is completed by cutting the tube 90 with a wet saw 124 at a position 126 spaced along the cylindrical tube 90 from the transitional portion 56 or the shoulder area 110, as shown in FIG. 10J. The cut end of the cylindrical tube at position 126 is heat or flame polished to eliminate any slight projections resulting from wet sawing the tube 90. Eliminating any such slight projections in this manner has eliminates stress concentration points which might cause the holder 50 to break.

Construction of the fiber 52 of the flexure 20 (FIGS. 2-5) commences with use of a small diameter solid quartz rod 130, shown in FIG. 11A. The rod 130 has a diameter of about 1 mm and is of a manageable length of approximately 100 mm, for example. The rod 130 has been ultra sonically cleaned for approximately 10 minutes in a 2% micro-90 solution, and then rinsed in tap water. Next, the rod is rinsed in de-ionized water and then hot air dried. The rod is then etched for three minutes in a 25% hydrofluoric acid solution, followed by a tap water rinse, a de-ionized water rinse and then air dried. Once prepared in this manner, the rod 130 is subjected to the actions which form part of it into the fiber 52.

An upper end 132 (as shown) of the rod 130 is connected by a conventional clamp 134 to a stationary structure 136, or otherwise held in a stationary position, while the remainder of the rod 130 hangs vertically downward from the upper stationary-supported end 132. Another conventional clamp 138 is attached to a lower end 140 (as shown) of the rod 130. A relatively small magnet 142 which produces substantial magnetic flux, such as a conventional rare earth magnet, is connected to the clamp 138. The lower end 140 of the vertically suspended rod 130, the lower clamp 138 and the magnet 142 are located vertically above a center opening 144 of a vertically oriented tube 146. The electrically conductive tube 146 is electrically conductive and is formed from relatively low electrical resistance material such as copper or aluminum.

Heat from a methane-oxygen flame or from a laser is applied along a middle section 150 of the rod 130 between its ends 132 and 140, as shown in FIG. 11A. The heat uniformly heats the middle section 150 of the rod 130 until it becomes viscous and flowable. Gravity acts on the viscous middle section 150 and the lower end 140 of the rod 130, on the clamp 138 and on the magnet 142, causing the viscous middle section 150 of the rod 130 to stretch as shown in FIG. 11B. The lower end 140 of the rod 130, the clamp 138 and the magnet 142 move downward into the center opening 144 of the tube 146 under the influence of gravity.

The magnetic flux from downward moving magnet 142 induces eddy currents in the conductive tube 144. The eddy currents flow circumferentially around the conductive tube 144, and create a magnetic flux and upward oriented magnetic force within the tube which opposes the magnetic flux of the magnet 142, thereby creating an oppositional force to resist the downward movement of the magnet 142 under the influence of gravity. The magnitude of eddy currents induced in the tube 144 is related to the speed at which the magnet 142 descends within the tube. The amount of oppositional magnetic force created by the eddy currents in the tube 144 increases with the speed of descent of the magnet 142. At a sufficient rate of descent, the oppositional force from the eddy currents interact with the magnetic flux from the magnet 142 to counterbalance the gravitational force on the viscous middle section 150 and the lower end 140 of the rod 130, on the clamp 138 and on the magnet 142, causing the speed of the descent of the magnet 142, the clamp 138 and the lower end 140 of the rod 130 to stabilize at a constant downward velocity.

The viscous middle section 150 of the rod 130 stretches at a constant rate once the constant downward velocity of the magnet 142, the clamp 138 and the lower end 140 of the rod 130 are stabilized in their downward descent rate. At some point in the constant downward descent after the viscous middle section 150 has stretched considerably, the middle section 150 cools and its viscosity decreases enough to increase the mechanical resistance to further downward descent, causing the lower end 140 of the rod 130 and the clamp 138 and the magnet 142 to slow and ultimately gently terminate further descent within the tube 144.

The constant rate of descent of the lower end 140 of the rod 130, the clamp 138 and the magnet 142 within the conductive tube 144 stretches the middle section 150 of the rod 130 at a constant rate while the middle section 150 remains viscous. The constant rate stretching of the middle section 150 of the rod 130 has the effect of drawing down the viscous middle section 150 to a substantially constant diameter along its length. Transitional portions of the middle section 150 adjacent to the ends 132 and 140 of the rod 130 experience a reduction in diameter, but those transitional portions are not part of the constant diameter section 150 and are not used to form the fiber 52 of the flexure 20 (FIGS. 1-5). The constant diameter middle section 150 is drawn down to approximately 30μ in diameter for use as the fiber 52, in the preferred example of the flexure 20 described herein.

By starting with similar rods 130 (FIG. 11A), which have the same initial diameter and which have been subjected to the same preconditioning described above, multiple middle sections 150 having substantially the same diameter are created from each of the similar rods 130. The middle sections 150 each have substantially the same diameter as a result of using the same magnet 142 moving downward within the same tube 144 to achieve a constant rate of descent and constant rate of stretching of the middle section 150. In this manner, multiple similar fibers 52 are created for each of multiple similar flexures 20 (FIGS. 1-3).

Next, as shown in FIG. 11C, the constant diameter middle section 150 is cut at a position 152 near one end of the constant diameter middle section 150, preferably with a scissors. A video camera with microscopic expansion and measuring capabilities is used to select the position 152 at which the constant diameter middle section 150 is cut. The position 152 is selected to avoid including any portion of the larger diameter transitional portions between the ends 132 and 140 and the constant diameter center section 150. A piece 154 of the constant diameter middle section 150 remains connected to one of the ends 132 or 140 (end 132 is shown in FIG. 11C). As is explained below, leaving the piece 154 connected to the end 132 facilitates construction of the flexure 20 (FIGS. 2-5). A part of the piece 154 becomes a fiber 52 for one or more flexures 20 (FIGS. 2-5).

Construction of the flexure 20 commences by chucking a holder 50 (FIG. 10J) into one of the spindles of the glass lathe (FIG. 9). The end 132 of the rod 130 to which the piece 154 remains connected (FIG. 11C) is chucked into the other one of the spindles of the glass lathe (FIG. 9). The cut end of the uniform diameter piece 154 (FIG. 11C) constitutes the end 64 of the fiber 52 (FIGS. 4 and 5).

The end 64 of the constant diameter piece 154 is inserted into the axial opening 60 of the holder 50, as shown in FIG. 12A. The end 64 of the piece 154 is extended substantially completely through the axial opening 60 in the retainer portion 58 of the holder 50. Heat from a hydrogen-oxygen flame or a laser, for example, is applied to the exterior of the retainer portion 58 to fuse the retainer portion 58 and the end 64 into the single integral mass 66 (FIG. 3).

Simultaneously with the application of the heat, a stream 156 of cover gas, such as argon or helium, is directed from a nozzle 158 onto the piece 154 at a position directly adjoining the inner end 62 of the retainer portion 58 of the holder 50. The stream 156 of cover gas cools the piece 154 adjacent to the end 62 to prevent the piece 154 from becoming sufficiently viscous so that the larger mass 66 of the molten retainer portion 58 and end 64 do not draw material from the piece 154 outside of the end 62. In this manner, the stream 156 of cover gas ensures that the diameter of the piece 154 adjacent to the end 62 of the retainer portion 58 remains constant in diameter and is not diminished in diameter when the retainer portion 58 and the inner end 64 of the piece 154 are integrally fused together. Consequently, the diameter of the piece 154 fiber 52 immediately adjacent to the inner end 62 of the holder 50 remains the same diameter as the fiber 52 at other locations along the length of the fiber 52.

Next, as shown in FIG. 12B, a portion 160 is cut out of the piece 154, thereby separating the end 132 and transitional portion (FIG. 12A) from the piece 154. The portion 160 has sufficient length to form the fiber 52 of the flexure 20 (FIGS. 2-5) and to form the end 64 of the fiber 52 (FIG. 4). The remaining portion of the piece 154 and the connected end 132 are removed from the chuck of the spindle of the glass lathe, for later use in fabricating another fiber 52 for another flexure 20, if the length of the remaining piece 154 is sufficient for that purpose.

Thereafter, as shown in FIG. 12C, another holder 50 is inserted in the chuck of the spindle of the glass lathe. The end of the portion 160 is inserted into the axial opening 60 of the second holder 50. The extent of insertion precisely establishes the length of the fiber 52 between the inner ends 62 of the holders 50 (FIG. 2). A video camera with microscopic expansion and measuring capabilities is used to establish the precise length of the fiber 52. The actions described above in connection with FIG. 12A, including the application of the stream 156 of cover gas from the nozzle 158, are repeated to fuse the end 64 of the portion 160 and the retainer portion 58 of the second holder 50 into the integral mass 66 (FIG. 3), thereby completing the formation of the flexure 20 (FIGS. 1-3).

Construction of the flexure 20 is completed by applying a thin conductive layer 162 of electrically conductive material, such as gold palladium, to the exterior of the holder 50 and the fiber 52 of the flexure 20, as shown in FIG. 13A. The conductive layer 162 electrically connects the flexure 20 to one of the pendulum suspension structures 30 or 34, which are connected through the post 40 to the base 42 (FIG. 1). In essence, the flexures 20 are electrically connected to the same common reference potential as the surrounding components, thereby draining any electrostatic charge that might otherwise accumulate on the flexures 20 during use. An accumulation of static charge on the flexure will electrostatically attract and repel the flexure with respect to adjoining structures and thereby adversely influence the oscillation characteristics of the pendulum. Adverse influences on the oscillation of the pendulum create inaccuracies in the quantity being measured by the pendulum device.

The conductive layer 162 is applied as discussed in connection with FIGS. 13B and 13C. To begin, as shown in FIG. 13B, the flexure 20 is placed inside a chamber 164. An oxygen plasma is directed onto the flexure 20 within the chamber 164. The oxygen plasma oxidizes any hydrocarbon impurities on the surface of the flexure 20, turning those impurities into carbon dioxide and thereby leaving the flexure 20 clean. A clean surface of the flexure is essential to achieving good adherence of the layer 162 (FIG. 13A).

Next, as shown in FIG. 13C, the clean flexure is placed in a sputter coating chamber 166. The conductive layer 162 is sputter coated or deposited in the conventional manner onto the quartz or other energy-conserving material of the clean flexure 20. The electrically conductive layer 162 is very thin in depth and uniform in thickness, for example a few microns, a few hundred angstroms, or a few molecules in depth. Despite the relative thinness of the layer 162, its thickness is sufficient to prevent any electrical charge from accumulating on the flexure.

The electrically conductive layer 162 is sufficiently thin and flexible to avoid adversely influencing the flex characteristics of the flexure 20. As a result, the flex and oscillating characteristics of the flexure 20 are established principally by the flex characteristics of the quartz or other energy-conserving material which forms the fiber 52 (FIG. 2). The electrically conductive layer 162 also remains adherent and sufficiently flexible to avoid cracking or separating during oscillation of the pendulum. The electrically conductive layer 162 does not diminish the strength or integrity of the quartz or other energy-conserving material from which the flexure 20 is formed. The metallic conductive layer 162 should not be highly stressed, create excessive tension on the exterior of the fiber 52 and/or create nucleations on the underlying quartz or other energy-conserving material, because such effects weaken the fiber 52 and makes it prone to break after a time of oscillation. Any stresses from the conductive layer 162 should be compatible with and comparable to the stresses occurring within the quartz or other energy conserving material of the fiber 52 during oscillation. Preferably, the electrically conductive coating is gold palladium. A conductive layer which is not satisfactory for long-term oscillation is tin oxide.

Forming the flexure 20 with the structure described and in the manner described results in a substantial improved flexure compared to the known prior art flexures used in pendulums.

The length of the fiber 52 between the inner ends 62 of the two oppositely positioned retainer portions 58 of the holders 50 is precisely established by use of the microscopic expansion and measuring capabilities of the video camera, when the second holder 50 is fused as described in connection with FIG. 12C. In this manner, the precise oscillation length (L) of the fiber 52 is established.

The use of the stream 156 of cover gas (FIG. 12A) maintains the constant diameter of the fiber 52 between the inner ends 62 of the retainer portions 58 of the holders 50 (FIG. 2). Consequently, the fiber 52 is not weakened at the point where it is fused to the holder 50. The fiber 52 is not more prone to fail from the mechanical stress of vibration at the location where it is fused to the holder 52, since the diameter of the fiber 52 remains undiminished at this position.

Similarly, since the diameter of the fiber 52 remains constant at the position adjoining the inner ends 62 of the retainer portions 58, the uniform diameter of the fiber 52 along its entire length establishes substantially similar flex and natural resonant frequency operating characteristics. Furthermore, these natural resonant frequency operating characteristics are similar among multiple flexures 20 constructed in the manner discussed above, due to the substantially constant and uniform diameter fibers 52 obtained from substantially uniform diameter middle sections 150 (FIGS. 11B and 11C) of multiple rods 130 which have been processed in a substantially similar manner as described above.

The retainer portions 58 of each of the holders 50 are of sufficient mass and rigidity to prohibit any flexure. Consequently, only the fiber 52 flexes between the inner ends 62 of the retainer portions 58 of the holders 50 at opposite ends of the flexure 20 (FIG. 2). The natural resonant frequency operating characteristics of the pendulum results substantially only from the characteristics of the fiber 50, allowing the natural resonant frequency and length characteristics to be predetermined and made uniform among multiple ones of the flexures 20.

The flexure of the present invention prevents the accumulation of electrostatic charges. Aberrations in the oscillation of the pendulum due to the accumulation of static charge are avoided, and as a consequence, the quantity (e.g., gravity) measured by the pendulum is more accurate.

The method of constructing the pendulum armed flexure 20 as discussed above involves uniform, precise and repeatable actions. As a consequence, multiple pendulum arm flexures having substantially identical length, flex and natural resonant frequency operating conditions can be produced on a controllable, precise and repeatable basis. The substantially identical characteristics allow two pendulum arm flexures to be used effectively to suspend a single bob in a single pendulum device, and/or allow multiple similar pendulums to be used effectively in multiple pendulum devices. Undesirable modes of motion are avoided by using multiple pendulum arm flexures having substantially identical length, flex and natural resonant frequency operating characteristics. The loss of oscillation energy is avoided by using multiple pendulum arm flexures according to the present invention.

The significance of these and other improvements and advantages will become apparent upon gaining a full appreciation of the present invention. Preferred embodiments of the invention and many of its improvements have been described with a degree of particularly. The detail in describing the preferred examples is not necessarily intended to limit the scope of the invention. The scope of the invention is defined by the following claims.

What is claimed is:

1. A pendulum arm flexure for supporting a pendulum bob for oscillation from a support structure, comprising:
   an elongated fiber having opposite ends; and
   a holder located at each opposite end of the elongated fiber; and
   wherein:
   the holder at one end of the elongated fiber is adapted to rigidly connect the pendulum arm flexure to one of the pendulum bob or the support structure and the holder at the other end of the elongated fiber is adapted to rigidly connect the pendulum arm flexure to the other one of the pendulum bob or the support structure;
   each holder includes an inner end adjacent to the fiber;
   the fiber extends continuously between the inner ends of the holders;
   the inner end of each holder has a relatively larger cross-sectional size than a relatively smaller cross-sectional size of the fiber at a position adjacent to the inner end of each holder;
   each holder transitions abruptly from the relatively larger cross-sectional size of the inner end relative to the relatively smaller cross-sectional size of the fiber at the position adjacent to the connection of the fiber to the holder;
   the fiber has a predetermined length measured between the abrupt transitions of the inner ends of the opposite holders;
   the fiber has resiliency characteristics which permit flexing along the length of the fiber between the inner ends of the holders during oscillation;
   each holder has rigidity characteristics which prevent flexing of the holder during oscillatory movement of the pendulum bob; and the fiber is formed of energy conserving material which temporarily stores energy expended in flexing the fiber in one direction as intermolecular force and which releases the stored energy upon flexing the fiber in the opposite direction.

2. A pendulum arm flexure as defined in claim 1, wherein: the fiber has a substantially uniform cross-sectional size between the inner ends of the opposite holders.

3. A pendulum arm flexure as defined in claim 1, wherein: the resiliency characteristics of the fiber are substantially uniform along the length of the fiber between the inner ends of the holders.

4. A pendulum arm flexure as defined in claim 1, further comprising:
an electrically conductive coating covering the fiber and each holder.

5. A pendulum arm flexure as defined in claim 1, wherein: each holder is integrally connected to the fiber.

6. A pendulum arm flexure as defined in claim 1, wherein: each holder is integrally fused to the fiber.

7. A pendulum arm flexure as defined in claim 6, wherein: the fiber and both holders are separately formed before each holder is integrally fused to the fiber.

8. A pendulum arm flexure as defined in claim 6, wherein: the fiber and both holders are formed of the same material.

9. A pendulum arm flexure as defined in claim 8, wherein: the same material is capable of melting upon the application of sufficient heat.

10. A pendulum arm flexure as defined in claim 8, wherein: the same material comprises a glass material.

11. A pendulum arm flexure as defined in claim 8, wherein: the same material comprises quartz.

12. A method of constructing a pendulum arm flexure which supports a pendulum bob from a support structure for oscillation, the pendulum arm flexure comprising an elongated fiber having opposite ends and first and second holders located at opposite ends of the elongated fiber, each holder connecting the pendulum arm flexure to one of the pendulum bob or the support structure, the method comprising:
forming the first holder separately from the second holder;
forming the fiber separately from both holders;
connecting the first holder to one end of the elongated fiber; and
connecting the second holder to the other end of the elongated fiber at a predetermined distance from the first holder to establish the length of the pendulum arm flexure for oscillatory movement as the predetermined distance along the fiber between the first and second holders.

13. A method as defined in claim 12, further comprising: integrally connecting the holders to respectively opposite ends of the separate fiber.

14. A method as defined in claim 12, further comprising: fusing each holder to each end of the fiber to integrally connect the holders to the ends of the fiber.

15. A method as defined in claim 14, further comprising: separately forming each holder and the fiber of the same material which is capable of fusion upon the application of sufficient heat.

16. A method as defined in claim 15, wherein the same material comprises quartz.

17. A method as defined in claim 14, further comprising:
forming an inner end of each separate holder to include an opening within which to receive an end of the fiber;
inserting the end of the fiber into the opening in the inner end of each separate holder; and
fusing the inner end of each separate holder and the end of the fiber within the opening to integrally connect each holder to the opposite ends of the fiber.

18. A method as defined in claim 17, further comprising:
fusing the inner end of each separate holder and the end of the fiber within the opening by the application of heat to the holder sufficient to melt the inner end; and
directing a stream of cover gas over the fiber adjacent to the inner end of each holder when fusing each holder to the end of the fiber to cool the fiber and prevent melting of the fiber adjacent to the inner end of the holder.

19. A method as defined in claim 12, further comprising:
forming the fiber to have a substantially uniform cross-sectional size along the length of the flexure between the holders at the opposite ends of the fiber.

20. A method as defined in claim 19, wherein forming a separate fiber to have a substantially uniform cross-sectional size further comprises:
heating the center section of a rod of material from which the fiber is formed sufficiently to make the center section of the rod viscous and flowable;
moving opposite ends of the rod away from one another at a substantially constant rate to draw down the viscous center section of the rod into a substantially uniform and reduced cross-sectional area along a sufficient length to constitute the fiber; and
cutting the fiber from the substantially uniform and reduced cross-sectional area of the drawn down center section of the rod.

21. A method as defined in claim 20, wherein moving the opposite ends of the rod away from one another at a substantially constant rate further comprises:
suspending the rod vertically above a hollow tube of electrically conductive material;
attaching a magnet to the lower end of the vertically suspended rod; and
establishing the substantially constant rate by movement of the magnet within the electrically conductive tube to generate eddy currents which create magnetic force which interacts with the magnet to establish a constant rate of descent of the magnet within the tube.

22. A method as defined in claim 12, further comprising:
coating an exterior of the flexure with an electrically conductive material.

* * * * *